United States Patent
Jain

(10) Patent No.: US 8,266,131 B2
(45) Date of Patent: Sep. 11, 2012

(54) METHOD AND A SYSTEM FOR SEARCHING INFORMATION USING INFORMATION DEVICE

(76) Inventor: Pankaj Jain, New Delhi (IN)

( * ) Notice: Subject to any disclaimer, the term of this patent is extended or adjusted under 35 U.S.C. 154(b) by 225 days.

(21) Appl. No.: 12/296,674

(22) PCT Filed: Jun. 1, 2007

(86) PCT No.: PCT/IN2007/000222
§ 371 (c)(1),
(2), (4) Date: Oct. 10, 2008

(87) PCT Pub. No.: WO2008/012834
PCT Pub. Date: Jan. 31, 2008

(65) Prior Publication Data
US 2009/0281997 A1    Nov. 12, 2009

(30) Foreign Application Priority Data
Jul. 25, 2006    (IN) .......................... 1704/DEL/2006

(51) Int. Cl.
G06F 7/00    (2006.01)
G06F 17/30    (2006.01)

(52) U.S. Cl. . 707/706; 707/805; 707/958; 707/E17.005; 707/E17.015; 715/848; 345/156; 345/173; 345/419

(58) Field of Classification Search ............... 707/999.3, 707/713, 706, 805, 958, 962, E17.005, E17.015, 707/999.102, 765, 766; 706/47; 715/848; 345/156, 173, 419

See application file for complete search history.

(56) References Cited

U.S. PATENT DOCUMENTS

| | | | | |
|---|---|---|---|---|
| 5,640,553 | A * | 6/1997 | Schultz | 1/1 |
| 5,767,854 | A * | 6/1998 | Anwar | 715/848 |
| 5,848,396 | A * | 12/1998 | Gerace | 705/10 |
| 6,256,633 | B1 * | 7/2001 | Dharap | 1/1 |
| 6,556,226 | B2 * | 4/2003 | Gould et al. | 715/850 |
| 6,609,123 | B1 * | 8/2003 | Cazemier et al. | 707/E17.005 |
| 6,678,679 | B1 * | 1/2004 | Bradford | 1/1 |
| 6,690,402 | B1 * | 2/2004 | Waller et al. | 715/850 |
| 6,766,320 | B1 * | 7/2004 | Wang et al. | 1/1 |
| 6,778,979 | B2 * | 8/2004 | Grefenstette et al. | 1/1 |
| 6,829,599 | B2 * | 12/2004 | Chidlovskii | 1/1 |
| 7,080,066 | B1 * | 7/2006 | Scheurich et al. | 1/1 |
| 7,149,984 | B1 * | 12/2006 | Rock et al. | 715/838 |
| 7,428,528 | B1 * | 9/2008 | Ferrari et al. | 1/1 |
| 7,734,607 | B2 * | 6/2010 | Grinstein et al. | 707/705 |
| 2001/0047355 | A1 * | 11/2001 | Anwar | 707/5 |

(Continued)

OTHER PUBLICATIONS

Dehne, Frank, et al., "Parallel Querying of ROLAP Cubes in the Presence of Hierarchies", DOLAP '05, Bremen, Germany, Nov. 4-5, 2005, pp. 89-96.*

(Continued)

Primary Examiner — John E Breene
Assistant Examiner — Anh Ly
(74) Attorney, Agent, or Firm — Timberline Patent Law Group

(57) ABSTRACT

A method and system for searching information using information device is provided. The method for searching information comprises generating one or more questions corresponding to a search query. The questions are generated based on a predetermined ordering criterion when a predefined condition is true. One or more responses to the questions are received from a user. Information is rendered on the information device based on one or more of a response and the search query.

36 Claims, 8 Drawing Sheets

U.S. PATENT DOCUMENTS

| | | | |
|---|---|---|---|
| 2002/0111994 A1* | 8/2002 | Raghunandan | 709/203 |
| 2004/0068486 A1* | 4/2004 | Chidlovskii | 707/3 |
| 2005/0033711 A1* | 2/2005 | Horvitz et al. | 706/50 |
| 2005/0060289 A1* | 3/2005 | Keenan et al. | 707/3 |
| 2005/0108200 A1* | 5/2005 | Meik et al. | 707/3 |
| 2005/0222989 A1* | 10/2005 | Haveliwala et al. | 707/3 |
| 2005/0234881 A1* | 10/2005 | Burago et al. | 707/3 |
| 2005/0240580 A1* | 10/2005 | Zamir et al. | 707/4 |
| 2006/0064411 A1* | 3/2006 | Gross et al. | 707/3 |
| 2006/0074883 A1* | 4/2006 | Teevan et al. | 707/3 |
| 2006/0143162 A1* | 6/2006 | Bernacki et al. | 707/3 |
| 2006/0149622 A1* | 7/2006 | Baluja et al. | 705/14 |
| 2006/0253428 A1* | 11/2006 | Katariya et al. | 707/3 |
| 2007/0061332 A1* | 3/2007 | Ramer et al. | 707/10 |
| 2007/0150515 A1* | 6/2007 | Brave et al. | 707/104.1 |
| 2007/0192318 A1* | 8/2007 | Ramer et al. | 707/7 |
| 2010/0037161 A1* | 2/2010 | Stading et al. | 715/764 |
| 2010/0293057 A1* | 11/2010 | Haveliwala et al. | 705/14.66 |
| 2011/0106795 A1* | 5/2011 | Maim | 707/728 |

OTHER PUBLICATIONS

Chu, Wesley W., et al., "Neighborhood and Associative Query Answering", Journal of Intelligent Information Systems, vol. 1, Kluwer Academic Publishers, Boston, MA, © 1992, pp. 355-382.*

Riedewald, Mirek, et al., "pCube: Update-Efficient Online Aggregation with Progressive Feedback and Error Bounds", SSDM 2000, Berlin, Germany, Jul. 26-28, 2000, pp. 95-108.*

Sarawagi, Sunita, "User-cognizant multidimensional analysis", The VLDB Journal, vol. 10, Issues 2-3, Sep. 2001, pp. 224-239.*

Hurley, Gareth, et al., "DubLet: An Online CBR System for Rental Property Recommendation", ICCBR 2001, LNAI 2080, Springer-Verlag, Berlin, Germany, © 2001, pp. 660-674.*

Dolog, Peter, et al., "Personalization in Distributed e-Learning Environments", WW 2004, New York, NY, May 17-22, 2004, pp. 170-179.*

Chu, Wesley W., et al., "A Structured Approach for Cooperative Query Answering", IEEE Transactions on Knowledge and Data Engineering, vol. 6, No. 5, Oct. 1994, pp. 738-749.*

Croft, W. Bruce, "Effective Text Retrieval Based on Combining Evidence from Corpus and Users", IEEE Expert, vol. 10, Issue 6, Dec. 1995, pp. 59-63.*

Mothe, Josiane, et al., "DocCube: Multi-Dimensional Visualisation and Exploration of Large Document Sets", Journal of the American Society for Information Science and Technology, vol. 54, No. 7, © 2003, pp. 650-659.*

Plaisant, Catherine, et al., "Interface and Data Architecture for Query Preview in Networked Information Systems", ACM Transactions on Information Systems, vol. 17, No. 3, Jul. 1999, pp. 320-341.*

Kumar, Ravi, et al., "A Graph-Theoretic Approach to Extract Storylines from Search Results", KDD '04, Seattle, WA, Aug. 22-25, 2004, pp. 216-225.*

Johnson, Chris, "Novel Computational Techniques for Incident Reporting", AAAI Technical Report WS-00-03, AAAI, © 2000, pp. 20-24.*

Wang, Di, et al., "The Cognitive Demands of an Innovative Query Interface", AMIA 2002 Annual Symposium Proceedings, © 2002, pp. 850-853.*

David Spence and Tim Harris—"XenoSearch: Distributed Resource Discovery in the XenoServer Open Platform"—Proceedings of the 12th IEEE International Symposium on High Performance Distributed Computing (HPDC'03), 2003 IEEE—Jun. 22-24, 2003 Author(s): Spence, D. Comput. Lab., Cambridge Univ., UK Harris, T. on pp. 216-225.*

Bettina Berendt and Myra Spiliopoulou—"Analysis of navigation behaviour in web sites integrating multiple information systems"—The VLDB Journal (2000), vol. 9, No. 1, (pp. 56-75).*

* cited by examiner

METHOD AND A SYSTEM FOR SEARCHING
INFORMATION USING INFORMATION
DEVICE

FIELD OF THE INVENTION

The present invention relates to computing systems for information retrieval. More specifically, it relates to a method and system for searching information using information devices.

BACKGROUND OF THE INVENTION

Convergence of computing and telecommunication has contributed to the development of new devices as alternatives to desktop Personal Computer (PC) for accessing web content. Some examples of these new devices include, but not limited to, data enabled mobile phone, Personal Digital Assistant (PDA), pocket PC, interactive Television (TV), telematics device, game console, Interactive Voice Response (IVR) phone, and Advanced Speech Recognition (ASR) phone.

Internet and portable information devices like mobile phones have brought about remarkable changes in the ways of doing business and life styles. Mobile phones are no longer uncommon status symbols in the developing countries. Demand of mobile phones is expected to increase continuously. Recent technical improvements such as high resolution screens, high accuracy voice recognition, etc., have contributed to the increase in usage of these devices. On the other hand, only small fraction of web content is available on these devices despite vast technical advancements.

Information accessible by mobile phone users from an Internet portal is very limited when compared to the content accessible by desktop PCs because of the operational difficulty of small key pads and small screens. As opposed to the detailed display of search results in a desktop PC, preview of snippets of the links returned by a search engine cannot be displayed in the small screens of the portable information devices. It also poses a big problem in locating appropriate search result among a long list of search results in these devices. It is still more difficult in searching and retrieving desired content from the web in the case of IVR and ASR phones, as they do not posses any visual interface. Although the interactive TV has a big screen, the resolution of the screen is very less and the operation is also difficult. Because of the abovementioned problems, web content providers have to limit the amount of web content available on these devices.

Content discovery involving unstructured collection of documents without using content meta-data provides results of lesser quality. Relational Database Management System (RDBMS) is desired for highly structured scenarios. However, it does not handle too much heterogeneity and hierarchies. It is also inflexible in case of frequent schema changes. Therefore, RDBMS is not well suited to the management of information resources by the content provider for these kinds of applications.

Usually, web search engines are designed for unstructured corpus. The search engines provide ranked list of huge number of search results for key words input by a user. Therefore, these web search engines are not considered to be suitable for information devices having small display area and other operational limitations. There are some advanced search engines exist in the art, which use content meta-data. These advanced search engines create a category structure based on the search results. The user has to browse only through this fixed category structure without having the option of inputting his preferences or needs in an easy manner.

Some search engines allow browsing through multi-faceted interfaces. The search results provided by these search engines are classified according to different facets. These facets are defined beforehand based on the meta-data components of the content artifacts. Here, the user has to simply select one of the facets. The search engines of this kind do not provide interactive selection of content by the user, heterogeneity and semi-structuredness. In addition, search refinement is sometimes not possible after browsing along a facet has been completed.

SUMMARY OF THE INVENTION

It is an object of the present invention to provide a method and a system for searching information using information device by providing automated question and answer session to a user.

It is an object of the present invention to minimize the number of interactions or clicks in a search session by automatically and intelligently generating questions based on user responses to previous question in the question and answer session and the search query.

It is another object of the present invention to facilitate searching of information over a large content corpus.

It is yet another object of the present invention to provide the user with a way of finding relevant content by leveraging content meta-data, which is processed and stored along with the content in a semi-structured and multi-dimensional form.

It is one more object of the present invention to increase the avenues for monetization of content by the content and portal providers.

A method for searching information stored on a content corpus server using an information device is provided in accordance with an embodiment of the present invention. The method comprises generating one or more questions corresponding to a search query input by a user. The questions are generated based on a predetermined criterion when a predefined condition is true. One or more responses to one or more questions are received from the user. Information is rendered on the information device based on one or more of the search query and a response.

BRIEF DESCRIPTION OF THE DRAWINGS

The foregoing objects and advantages of the present invention for a method of and system for searching information using information device may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION

Figure 1:
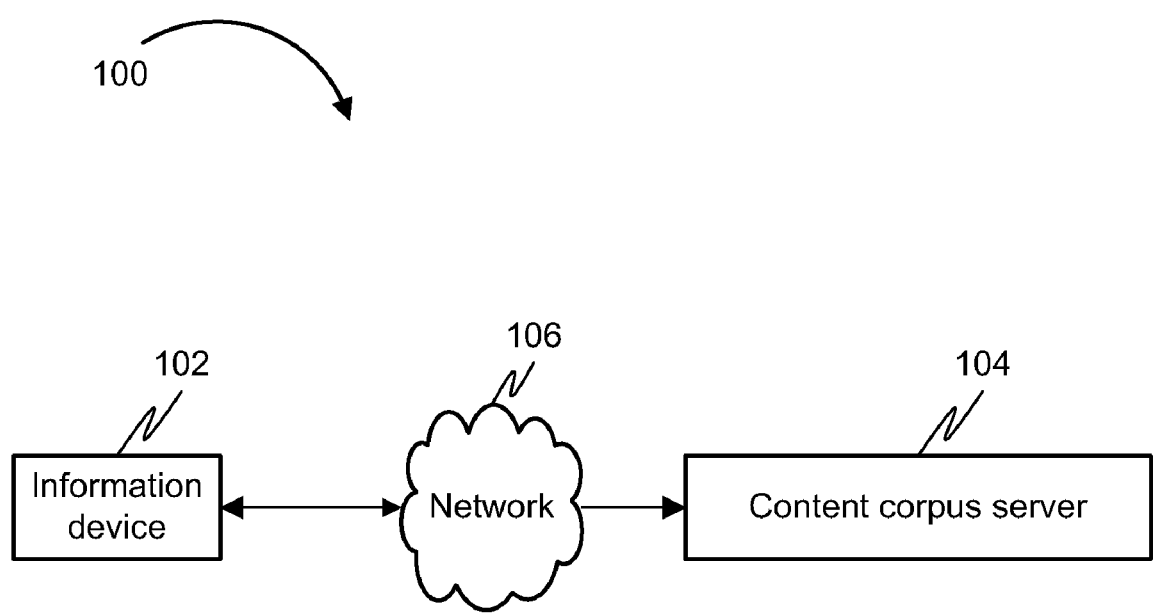
FIG. 1 is a block diagram showing an environment in which various embodiments of the present invention may function.

Before describing in detail embodiments that are in accordance with the present invention, it should be observed that the embodiments reside primarily in combinations of method steps and system components related to searching information using an information device. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or system that comprises, has, includes, contains a list of elements does not include only those elements but may include other elements not expressly listed or inherent to such process, method, article, or system. An element preceded by "comprises . . . a", "has . . . a", "includes . . . a", "contains . . . a" does not, without more constraints, preclude the existence of additional identical elements in the process, method, article, or system that comprises, has, includes, contains the element. The terms "a" and "an" are defined as one or more unless explicitly stated otherwise herein. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the present invention described herein may be comprised of one or more conventional processors and unique stored program instructions that control the one or more processors to implement, in conjunction with certain non-processor circuits, some, most, or all of the functions of the method and system for searching information described herein. The non-processor circuits may include, but are not limited to, a transceiver, signal drivers, clock circuits and power source circuits. As such, these functions may be interpreted as steps of a method for searching information described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments of the present invention provide a method and system for searching information using information device. The method described in the present invention enables a user of an information device like personal computer (PC), mobile telephone, Personal Digital Assistant (PDA), pocket PC, interactive Television (TV), telematics device, game console, Interactive Voice Response (IVR) phone, and Advanced Speech Recognition (ASR) phone to search information over a large content corpus.

FIG. 1 is a block diagram showing an environment 100 in which various embodiments of the invention may function. Environment 100 includes an information device 102 and a content corpus server 104. Examples of information device 102, include, but not limited to, personal computer (PC), data enabled mobile phone, Personal Digital Assistant (PDA), pocket PC, interactive Television (TV), telematics device, game console, Interactive Voice Response (IVR) phone, and Advanced Speech Recognition (ASR) phone. Content corpus server 104 can be a web server. Information device 102 communicates with content corpus server 104 through a network 106 such as Internet, Worldwide Interoperability for Microwave Access (WiMAX) network, Wireless Fidelity (WiFi) network, World Wide Web (WWW) and Hyper Text Transfer Protocol (HTTP) network, Wireless Application Protocol (WAP) network, and third generation (3G) mobile network.

A user inputs a search query on information device 102. Content corpus server 104 checks if a number of content-entities corresponding to the search query is more than a predefined number. The predefined number depends on the device characteristics of information device 102 or a predefined duration for which information can be rendered on information device 102. The device characteristics of information device 102 pertain to the capability of the device to render information. The device characteristics can include, but not limited to, size of display screen of information device 102, resolution of the display screen, and input unit like scrolling device, stylus or mouse of information device 102. The predefined duration is a maximum amount of time for which an audio or a voice prompt is rendered in a voice based information device 102 so as to be comfortably heard by the user.

The device characteristics may be different for different information devices 102. For instance, the device characteristics for a mobile phone are different from that of an interactive television. If the number of content-entities corresponding to the search query is large and display screen of information device 102 is small, then all the content-entities cannot be conveniently displayed for the user in the display screen of information device 102. In this case, the number of content-entities has to be reduced. When the number of content-entities is not more than the predefined number, the content-entities are displayed on the display screen of information device 102. On detecting that the number of content-entities pertaining to the search query is more than the predefined number, a question is generated corresponding to the search query for filtering the content-entities, which is described in conjunction with FIG. 2.

A computing system includes content corpus server 104, which stores data corresponding to different content-entities. A collection of such heterogeneous content-entities stored by content corpus server 104 is called as a content corpus.

In an embodiment of the present invention, content corpus server 104 stores data corresponding to the content-entities as meta-data. The meta-data maintained in the server is provided by content providers of the content-entities. The meta-data is a structured data that describes the characteristics of the heterogeneous content-entities. For instance, a meta-data for the content-entities representing "Book" can have author, title, and subject for each book Content corpus server 104 organizes the corpus into a plurality of cubes. Each cube comprises content-entities that have a similar set of dimensions. The dimensions can be hierarchical or flat. Dimension of a content-entity refers to a feature of the content-entity. For example, content-entities corresponding to "Bars", "Coffee shops" and "Restaurants" respectively form three different cubes. The cubes can be aggregated into cube-categories and the cube-categories are organized in a category hierarchy. The cubes "Bars", "Coffee shops" and "Restaurants" can belong to a cube-category "Eating places".

A set of cubes that belong to a cube-category can have common dimensions. For example, the cube-category "Eating places" comprising the cubes "Bars", "Coffee shops", and "Restaurants" can have common dimensions like "Price" and "Payment methods". A list of such dimensions that are common across all the cubes of the cube-category is called as a conformance list of the cube-category. On the contrary, each cube can have certain unique dimensions. For instance, the cube "Restaurant" may have "Cuisine" dimension while the cubes "Bars" and "Coffee shops" may not have this dimension. The dimension "Cuisine" can have dimension values like "Italian", "Chinese", "Continental", and "Middle East".

Content corpus server 104 stores various content-entities of the content corpus. When a user inputs a search query, it forms a content-entity set. The content-entity set is a portion of the entire corpus, which is considered as appropriate content to the user by content corpus server 104 based on the search query and responses received from the user. The content-entity set can comprise one or more cube-categories, out of which the youngest common ancestor cube-category as per the cube-category hierarchy is assigned as a root cube-category. If the content-entity set has only one cube-category, then that cube-category is assigned as the root cube-category. The root cube-category comprises cubes corresponding to the selected content-entities as its descendants. The content-entity set also has dimensions corresponding to the root cube-category and the selected content-entities. The content-entity set may also refer to the entire content corpus. The content-entity set can be filtered, expanded or changed according to the search query and the user response.

A user of information device 102 inputs a search query through information device 102 to retrieve information from content corpus server 104. The search query can be input to information device 102 through a user interface provided on information device 102. The search query can be a combination of one or more search terms. Search terms may be used in conjunction with one or more Boolean operators. Examples of the Boolean operators may include, but are not limited to, AND, OR, and ANDNOT. After receiving the search query, it is checked if the number of content-entities pertaining to the search query is more than a predefined number. The predefined number depends on the device characteristics of information device 102 or a predefined duration for which information can be rendered on a voice based information device 102 so as to be comfortably heard by the user. If the number of content-entities is more than the predefined number, then the content-entities are narrowed by the following steps. When the number of content-entities pertaining to the search query is not more than the predefined number, the content-entities are directly rendered on information device 102.

Figure 2:
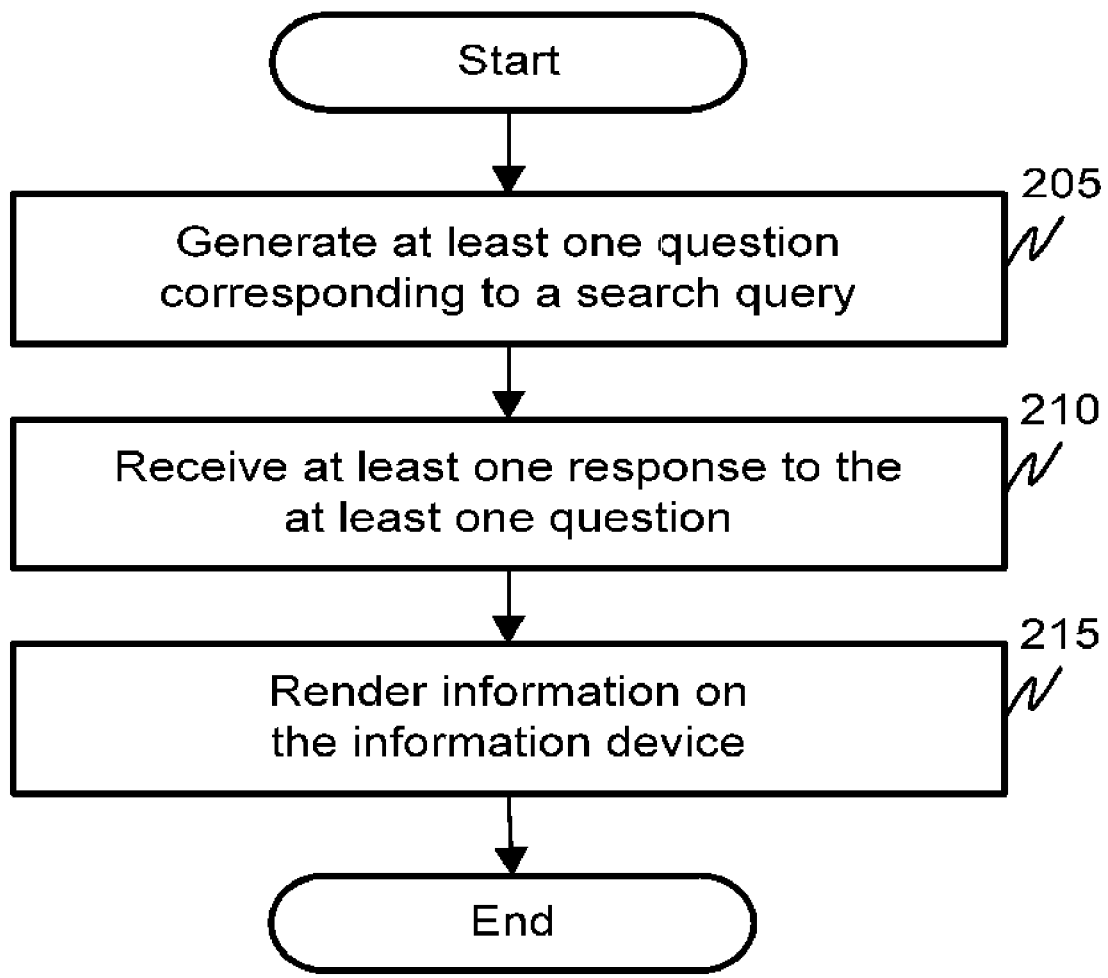
FIG. 2 is a flow chart for a method for searching information stored on a content corpus server, in accordance with an embodiment of the present invention.

FIG. 2 is a flow chart for a method for searching information stored on content corpus server 104 using information device 102, in accordance with an embodiment of the present invention. At step 205, one or more questions are generated corresponding to the search query. The questions are generated based on a predetermined ordering criterion when a predefined condition is true. Choices rendered along with a question are also ranked based on the predetermined ordering criterion. The predefined condition is true only if the number of content-entities pertaining to the search query is more than a predefined number. This predefined number depends on the device characteristics of information device 102 or a predefined duration for which the information can be rendered on voice based information device 102 so as to be comfortably heard by the user.

A first plurality of questions is generated based on the content-entity set computed based on the search query. For instance, only a specific number of questions can be generated based on the cube-categories, cubes and dimensions of the content corpus. This set of specific number of questions is called as a first plurality of questions. Consider an example in which content-entity set comprises only a single cube-category "Book", dimensions "binding type" and "Subject". Here the number of questions that can be possibly generated is limited and they constitute the first plurality of questions. In an embodiment of the present invention, a question is selected from the first plurality of questions based on the predetermined ordering criterion.

In an embodiment of the present invention, the predetermined ordering criterion is generated based on one or more of a selectivity function, an information retrieval rank, personalization rules and business rules. The predetermined ordering criterion can also be generated by combination of the selectivity function, information retrieval rank, personalization rules and business rules. In an embodiment of the present invention, the predetermined ordering criterion is generated based on the product of the selectivity function, information retrieval rank, personalization rules and business rules. The predetermined ordering criterion is used for ranking the content-entities, dimensions and cube-categories. Choices that are rendered to the user along with the question are also ranked based on the predetermined ordering criterion.

The selectivity function is a heuristic-based measure of expected number of user inputs or clicks that are required to retrieve information requested by the user. The selectivity function is used for ranking the dimensions and the cube-categories. The questions are generated based on the ranked dimensions and the cube-categories. The ranking is done such that the question generated corresponding to the highest ranked dimension or the cube-category results in lowest number of clicks. In an embodiment of the present invention, the selectivity function of a dimension refers to a measure that computes the expected reduction in the content-entity set while navigating the dimension. In an embodiment of the present invention, the selectivity function (S) of a dimension can be calculated using a formula:

$$S = 1/(c*(h + \text{sum over all levels}(Ceil(\log_B^{bi}) - 1)))$$

Where c is the average number of entities per leaf dimension value nodes, h is the height of a dimension tree, Ceil is the ceiling function, B is the predetermined condition corresponding to restriction or limitation of the user interface and $b_i$ is the average number of children per node at a level 'i' in the dimension tree.

Ranking of the meta-data stored in the content corpus server 104 can be carried out based on the relevance of the meta-data to the search query. Information retrieval ranking is performed based on the ranks of the meta-data. For instance, an information retrieval rank of a cube-category is a rolled up sum of the ranks of the cubes that are descendants of the cube-category. The personalization rules are determined based on one or more profiles of the user, profiles of a plurality of users, which are similar to the profile of the user, and a user-log. The profile of the user can be implicitly derived. For example, details like requirements, characteristics, preferences, and settings of the user can be tracked during the interaction with the user in different sessions and can be stored in a database or file, which serves as a profile of the user. The profile of the user can also be specified by the user himself. In an exemplary embodiment of the present invention, the user is asked to fill a sign-up form before using a search service for searching information stored on content corpus server 104. The sign-up form can comprise details like hobbies, health conditions, job field and other interests of the user. Details collected through such form can be used as a profile of the user and used for determining the personalization rules. When the predetermined ordering criterion is decided based on such personalization rules, questions relevant to the profile of the user may be generated. When the user uses portable information devices like mobile phone, the display screen and key pad are very small. Therefore, user may face difficulty in filling such forms and other details. In such cases, the profile of the user is derived implicitly as explained earlier. When the personalization rules are decided based on the profile of the user, different questions will be asked for different users.

In another embodiment of the present invention, the personalization rules are determined based on profiles of a plurality of users, which are similar to the profile of the user. Consider an example in which a profile of a user indicates that user has interest in Jazz music. Profiles of some other users indicate that they have interest in Jazz music and they have recently purchased a particular music album. In this case, personalization rules are determined based on the profiles of those users and they will be used for generating questions. Such questions may direct the user to view content-entities associated with the music album purchased by the other users with similar profile.

The personalization rules can also be determined based on the user-log. The user-log can include results of previous searches performed by the user, history, dimensions of the content-entities traversed previously by the user and actions performed in the past sessions. The taste and preferences of the user can be derived from the profile of the user and the user-log. For instance, if the user's profile indicates that he has always chosen a low-price food items, then the question on price range of the food items may not be a good question to ask as we know with a good deal of confidence that the user will select a low-price option. Instead a question on cuisine could be given a higher preference for that user. The personalization rules are decided based on one or more of the above-mentioned criteria such that an appropriate and minimum number of questions are provided to the user. Therefore, user-desired information can be provided in less time without requiring much effort from the user.

The personalization rules include one or more of rule based ranking rules, content based ranking rules, and collaborative ranking rules. The rule based ranking rules are employed only if the user satisfies a predefined set of conditions. For example, if general preference of teenagers is more towards cheap restaurants, then the price range question will be given a low preference for a teenage user as we know the answer with a great deal of confidence. The content based ranking rules are implemented for ranking content-entities based on a choice or a response given by the user. The collaborative ranking rules utilize the choices of a plurality of users having similar profile as that of the user. The choices selected by those similar users will be given higher priority and those choices will be provided to the user higher up in the order. The predetermined ordering criterion can also be decided by combining the content based rules and collaborative ranking rules.

In another embodiment of the present invention, the predetermined ordering criterion is decided according to business rules. The business rules include business metrics, like assigning priority to advertisements. Choices or questions that produce revenue to the content provider e.g. web portal, are given importance over the other choices or questions. Consider an example in which a question with a number of choices is provided to a user. Revenue generated through advertisements may vary from one choice to other choice. If revenue earned through the advertisement corresponding to a particular choice is higher than that earned though the advertisements corresponding to the remaining choices, then that particular choice will be listed first below the question. In other words, the order of choices is decided based on the revenue generated through the corresponding advertisements. Similarly, out of a plurality of questions that can be generated and rendered to the user, a question which has more potential to generate revenue than the other questions will be generated and rendered to the user.

In an embodiment of the present invention, cubes, cube-categories, dimensions or content-entities which can give monetary benefits to the content portal are assigned higher rank among the other cubes, cube-categories, dimensions or content-entities that are encompassed by the search query input by the user. The business metrics may also include ranking auctioned keywords, classification of keywords into revenue generating and non-revenue generating keywords. Keywords which can direct the user to content-entities that have a potential for revenue generation are termed as revenue generating keywords. Keywords which can direct the user to content-entities which do not have any potential for revenue generation are called as non-revenue generating keywords.

In an embodiment of the present invention, personalization and business rules are implemented using Identifiers (IDs) given to individual users and user groups. Each user is assigned with a unique user ID (UID). Thereafter, a plurality of users having similar interests or behavior is assigned a Group ID (GID). Additionally, each object in the content corpus server 104 like cube and cube-category is assigned with an Object ID (OID). Ranks generated based on the personalization rules will have UID, GID and OID as rank parameters. Ranks generated based on business rules will have OID as a rank parameter. For example, a user inputs "Music" as a search query. The profile of the user inferred from the previous actions of the user indicates that he is interested in Jazz music. If a dimension corresponds to music genre with dimension values such as Rock, Hip-hop, and Jazz, then the OID of the dimension value Jazz and the UID of the user will be used in assigning the rank to the dimension value Jazz. Consider the same example in which business rules are employed. If an advertisement for a CD released by a popular Rock band provides certain share to the content portal out of the CD sales performed through the content portal, then the OID of the dimension value "Rock" will be used in assigning the rank.

A question generated based on the predetermined criterion is rendered on the user interface of information device 102. The question can be a multiple choice question. At step 210, a response is received from the user corresponding to the question. In an embodiment of the present invention, if a question has a set of choices, then the question will direct the user to select a choice from the set of choices. In response to the question, the user may select a choice from the set of the choices.

In another embodiment of the present invention, a question may require the user to enter one or more keywords in response to the question. This is further explained in detail in conjunction with FIG. 3. At step 215, information is rendered on information device 102 based on one of more of the response received from the user and the search query if the predefined condition is not true. A check is performed to determine if the predefined condition is true based on the response received corresponding to the question. The predefined condition is true only if the number of content-entities pertaining to the search query is more than the predefined number that depends on the device characteristics of information device 102 or a predefined duration for which the information can be rendered on voice based information device 102 so as to be comfortably heard by the user. If the predefined condition is not true, then information is rendered on information device 102. If the predefined condition is true, then one or more succeeding questions are generated to narrow down the information. This is further explained in detail in conjunction with FIG. 3. As an example of the method given above, a user types "Asian cuisine" as a search query in the user interface of information device 102. In response to this search query, the question "What type of Asian cuisine?" is generated and is rendered on the user interface of information device 102. The question "What type of Asian cuisine?" will also include a number of choices, for example, "Central Asia", "East Asia", and "South Asia". The user may select one or more of the three choices as a response to the question.

In the abovementioned example, the content-entity set initially refers to the entire content corpus. When the user types "Asian cuisine," the content-entity set comprises only the content-entities corresponding to the Asian cuisine. The content-entity set comprises a list of cubes, cube-categories and dimensions. This list comprises dimensions associated with the search query or response input by the user. In the above example, cuisine is a dimension and "Central Asia", "East Asia", and "South Asia" are the dimension values.

Figure 3:
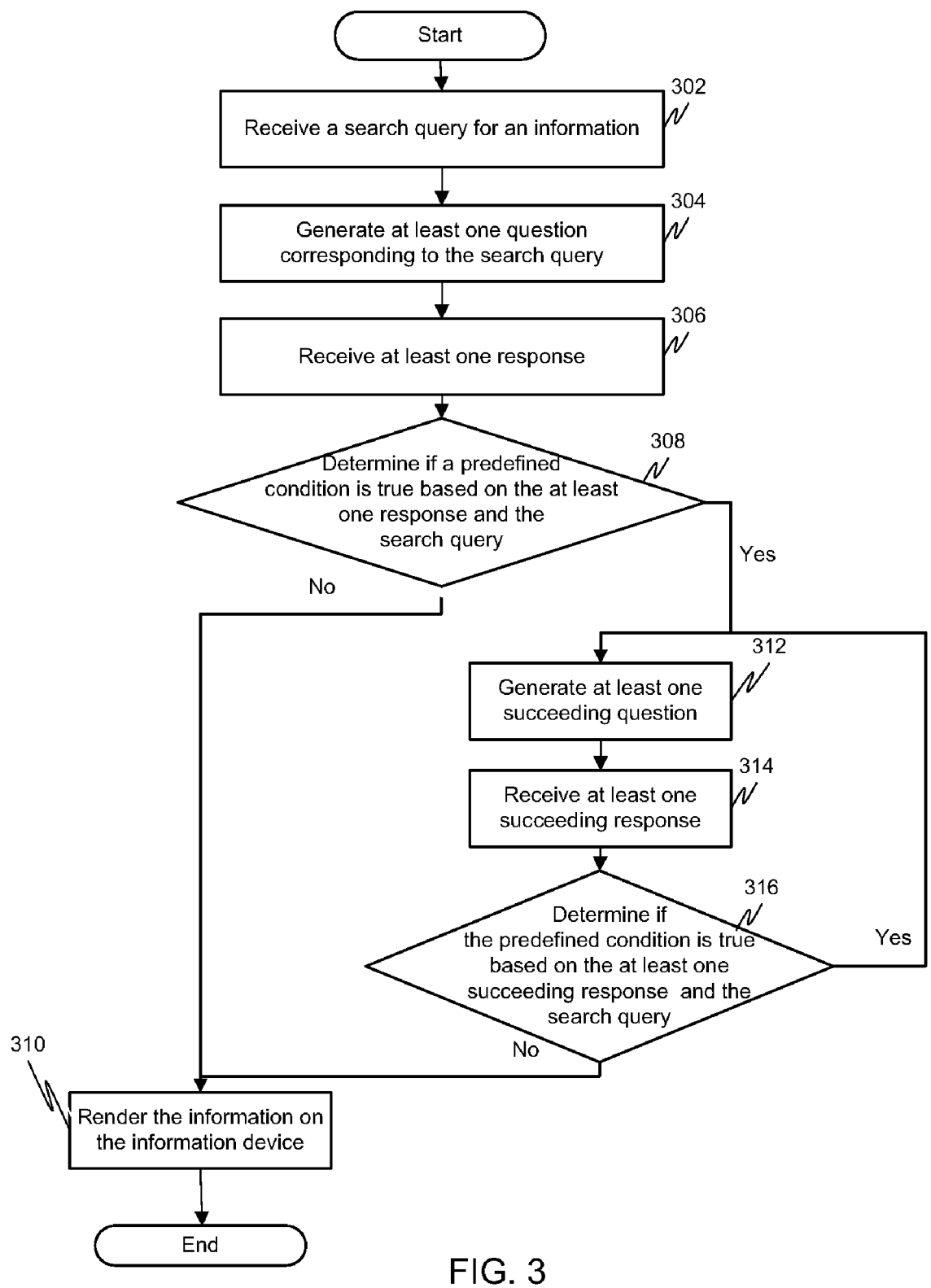
FIG. 3 is a flow chart for a method for searching information stored on a content corpus server, in accordance with another embodiment of the present invention.

FIG. 3 is a flow chart for a method for searching information stored on content corpus server 104, in accordance with another embodiment of the present invention. A search query for information is received from a user at step 302. One or more questions are generated corresponding to the search query from a first plurality of questions based on predetermined ordering criterion when a predefined condition is true at step 304. This has been already explained elaborately in conjunction with FIG. 2. The first plurality of questions is generated based on the content-entity set generated in response to the search query supplied by the user. At step 306, a response is received from the user. This has been explained in detail in conjunction with FIG. 2. At step 308, a check is performed to determine if the predefined condition is true based on the response received corresponding to the question and the search query. This is further explained in detail with conjunction with FIG. 4. Here, the content-entity set corresponding to the response and the search query from the user is checked.

In case the predefined condition is not true, then the information is rendered on the information device 102 at step 310. If the predefined condition is true, then step 312 is performed. At step 312, one or more succeeding questions are generated from a second plurality of questions based on the predetermined ordering criterion, the response received corresponding to the previous question and the search query. For example, a succeeding question on price range will be asked to the user after asking a question on the cuisine to the user. Example for the succeeding question can be the following: "What is your preferred price range?" with the choices like "low", "medium", and "high". At step 314, a succeeding response is received from the user. Here the selection of the choice "medium" can be an example for the succeeding response. At step 316, a check is performed to determine if the predefined condition is true based on the succeeding response and the search query. If the predefined condition is not true, then the information is rendered on information device 102 at step 310. If the predefined condition is true, then step 312 is repeated. At step 312, one or more succeeding questions are generated based on the predetermined ordering criterion, the responses of the user to the previous questions and the search query. The questions are iteratively generated based on the response of the user, until the predefined condition is not true.

Figure 4A:
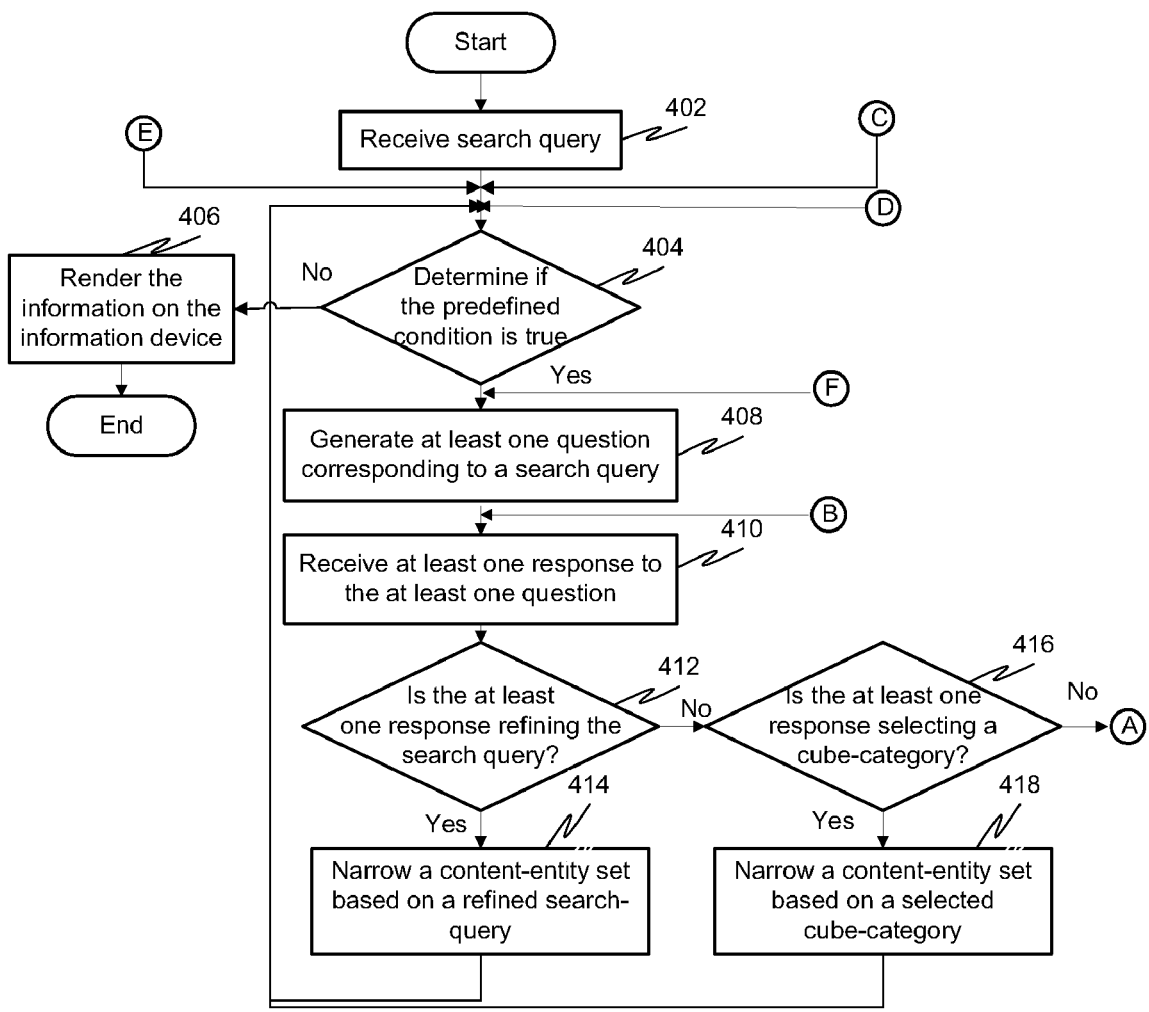
FIGS. 4A and 4B depict a flowchart for a method for searching information stored on a content corpus server, in accordance with another embodiment of the present invention.
Figure 4B:
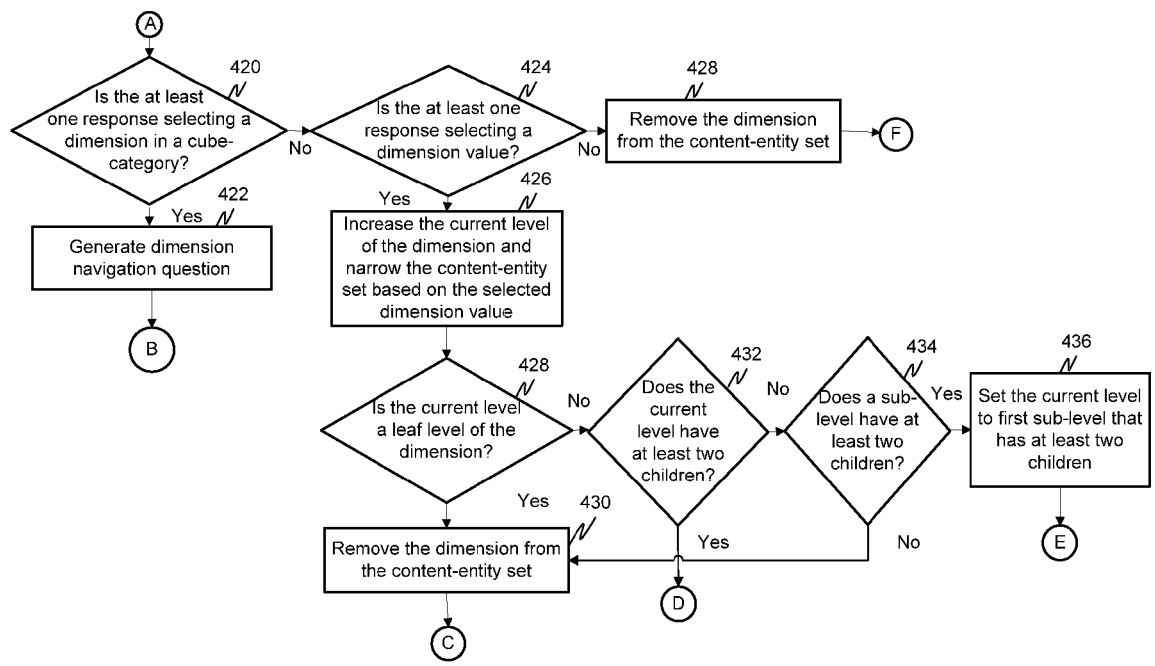

FIGS. 4a and 4b depict a flow chart for a method for searching information stored on content corpus server 104, in accordance with an embodiment of the present invention. A search query is received from a user at step 402. A check is then performed to determine if the predefined condition is true at step 404. The predefined condition is true if number of content-entities pertaining to the search query is more than a predefined number. The predefined number depends on the device characteristics of information device 102 or a predefined duration for which information can be rendered on voice based information device 102 so as to be comfortably heard by the user. If the predefined condition is not true, information is rendered on information device 102 at step 406. Further, if the predefined condition is true, one or more questions are generated corresponding to the search query input by the user at step 408. One or more questions are generated based on a predetermined ordering criterion. This has been explained in detail in conjunction with FIG. 2. At step 410, a response to a question is received from the user using the information device 102. At step 412, a check is performed to determine if the response is refining the search query. Refining the search query can be adding an additional term to the search query. If the response is refining the search query, then the content-entity set is narrowed based on the refined search-query, at step 414.

Consider an example in which the user initially inputs "Asian cuisine" as a search query. The question "What type of Asian cuisine?" is generated along with choices like "Central Asia", "East Asia", and "South Asia". In case, the results are broad compared to the results desired by the user, the user may add more terms "Chinese noodles" to the search query "Asian cuisine". In this example, information pertaining to "Chinese noodles" may belong to dimension value East Asia". Therefore, the content-entity set will have only the content-entities that are related to both the Asian cuisine and Chinese noodles. Here the content-entity set is narrowed corresponding to the refined search query. Thereafter, step 404 is performed to check if the predefined condition is true based on the refined search query. When the predefined condition is true, one or more questions are generated corresponding to the refined search query. If the predefined condition is not true, then the information is rendered on information device 102 at step 406.

Referring back to step 412, if the response is not refining the search query, then at step 416 a check is performed to determine if the response is selecting a cube-category. For example, in an online shopping portal, "Books", "Music", and "Jewelry" can be three cube-categories. In response to a search query "Gift items", the user interface renders a cube-category selection question "What type of gift items?" along with a number of choices like "Books", "Music", and "Jewelry". User selecting "Music" is a response for selecting a cube-category. If the user selects a cube-category, the content-entity set is narrowed based on the selected cube-category at step 418. In this example, the content-entity set will only have the content-entities corresponding to "Music". Thereafter, step 404 is repeated, in which a check is performed for determining if the predefined condition is true based on the selected cube-category. If the predefined condition is true, then one or more questions are generated corresponding to the selected cube-category. Otherwise, the information is rendered on information device 102 at step 406. In the above example, the content-entity set initially had three cube-categories, out of which one cube-category is selected by the user. Therefore, other two cube-categories are removed from the content-entity set along with the content-entities belonging to the other two cube-categories and questions will now be generated based on only the selected cube-category. The selected cube-category is made as the new root-cube category of the content-entity set. The dimension list of the content-entity set is also updated to add the new dimensions from the conformance list of the new root cube-category.

Referring back to step 416, if the response is not selecting a cube-category, then at step 420, a check is performed to determine if the response is selecting a dimension in a cube-category. Consider an example in which, a cube-category "Books" can have different dimensions like "Price", "Subject" and "Binding type". If the user is presented a dimension selection question with choices "Price", "Subject" and "Binding type" and decides to search the books by subject, then his response is for selecting a "Subject" dimension in the cube-category "Books".

If the response is selecting the dimension in the cube-category, then a dimension navigation question is generated based on the selected dimension at step 422. Thereafter, step 410 is repeated for receiving at least one response from the user. Going back to step 420, if the response is not selecting a dimension in a cube-category, then step 424 is performed. At step 424, a check is performed to determine if the response is selecting a dimension value for a dimension in a cube-category. If the response is selecting the dimension value, then the current level of the dimension is increased and the content-entity set is narrowed based on the selected dimension value at step 426.

Consider an example in which user searches the cube-category "Restaurants" using the dimension "Location". In this case, if the user has selected a dimension value "USA" then the current level of the dimension will be increased. That is, once the user selects "USA", the dimension will be moved to a next level "Divisions" having dimension values of like "Pacific", "Midwest", "North East" and "South".

At step 428, a check is performed to determine if the current level is a leaf level of the dimension. The leaf level is the last level in the dimension hierarchy. If the current level is the leaf level, then the dimension is removed from the content-entity set at step 430. In the above example, the current level has more sub-levels; therefore it is not the leaf level.

Thereafter, step 404 is repeated to determine if the predefined condition is true. When the current level is not the leaf level, then step 432 is performed to determine if the current level has two or more children. If the current level has two or more children, then step 404 is repeated to determine if the predefined condition is true. For instance, if the user has selected "Pacific", then it has children like "Alaska", "California", "Oregon" and "Washington". Therefore, step 404 will be performed. Referring back to 432, if the current level does not have two or more children then step 434 is performed to determine if a sub-level of the current-level has two or more children. If the sub-level has two or more children, then the current level is set to a first sub-level that has at least two children at step 436. Consider the current level as the state with the dimension value "Washington" and it has only one city called "Seattle". However, this sub-level city has two children "East Seattle" and "West Seattle" at the city region sub-level. Even if the two regions have two or more children, the current level will be set to the first sub-level city region. Thereafter, step 404 is performed to determine if the predefined condition is true. At step 434, if there is no sub-level having at least two children then step 430 is performed to remove the dimension is removed from the content-entity set. Thereafter, step 404 is repeated.

Referring back to step 424, if the response is not selecting a dimension value, step 428 is performed. If the response is not selecting a dimension value, then it means that the user either does not know the answer to the posed question or does not care for the dimension. In this case, the user selects a predetermined default response like "any" or "don't know". Thereafter, step 428 is performed to remove the dimension navigated by the user and step 408 is repeated. If at any stage while executing step 408, there are no dimensions left and there is just one cube-category in the content-entity set then the system renders the list of all the content-entities in the content-entity set on information device 102.

Figure 5:
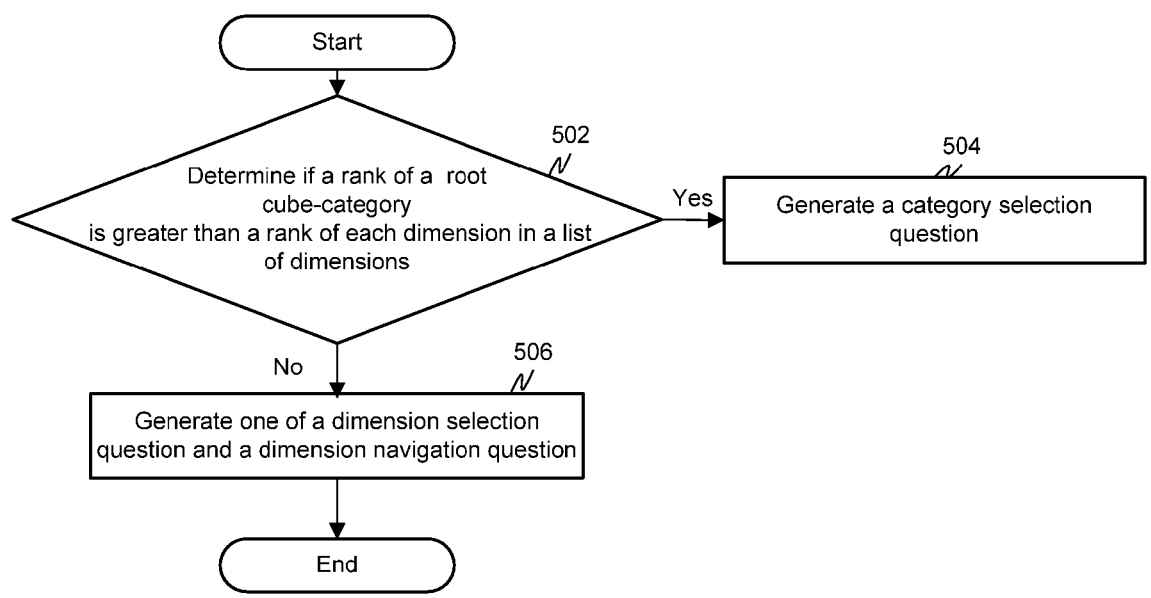
FIG. 5 illustrates a flow chart depicting a method for generating question, in accordance with an embodiment of the present invention.

FIG. 5 is a flow chart for a method for generating question in accordance with an embodiment of the present invention. Rank of the current root cube-category and each dimension in a list of dimensions of the content-entity set are determined based on predetermined factors like profile of the user and the selectivity function. A question, which directs a user to select a cube-category, is called as category selection question. Consider an example in which there are different cube-categories like "Books", "Music", and "Jewelry" under a root category "Gift".

At step 502, a check is performed to determine if the rank of the current root cube-category is greater than the rank of each dimension in a list of dimensions of the current content-entity set. In the above example, generation of a category selection question like "What kind of gift do you want to purchase?" will depend on the rank of that cube-category in comparison with the ranks of dimensions like "Price", and "Occasion". If the rank of the current root cube-category is greater than the rank of each dimension in the list of dimensions, then the category selection question is generated at step 504.

If the rank of the current root cube-category is lesser than the rank of some dimensions in the list of dimensions, then one of a dimension selection question and a dimension navigation question is generated at step 506. In the above example, dimension selection question can be questions pertaining to selection of dimensions like "Price", and "Occasion". Dimension navigation questions are the questions corresponding to navigation of a particular dimension.

A dimension navigation question is generated for a dimension having a rank which is higher than the ranks of all the other dimensions in the list of dimensions by at least a threshold value. For instance, if rank of a dimension "Subject" is more than that of the other dimensions by the threshold value, then questions pertaining to navigation of the dimension "Subject" will be asked directly.

Further, a dimension selection question is generated for a first set of dimensions in the list of dimensions, if the rank of each dimension in the first set of dimensions is similar but higher than the rank of each dimension in a second set of dimensions in the list of dimensions by the threshold value. The dimensions are considered similar if the difference between their ranks is less than the threshold value. Consider an example in which there are 5 dimensions D1-D5 for a cube and their ranks are as follows D1: 0.7, D2: 0.5, D3: 0.75, D4: 0.4, and D5: 0.55. After sorting them in descending order of the rank, the sequence of dimensions are as follows: D3: 0.75, D1: 0.7, D5: 0.55, D2: 0.5, and D4: 0.4. One can fix a threshold value for considering a set of dimensions as similar. If the threshold value is set as 0.9, then two ranks r1 and r2 (r1>=r2) are similar if (r2/r1)>0.9. Another way to look at this is to consider two ranks within 10% of each other as similar. Based on this value of similarity threshold, the dimensions can be partitioned into two sets. The first set comprises D3 and D1 while the second set comprises D5, D2, and D4. The ranks in first set are "similar", but "significantly greater" than those in the second set. Therefore, a dimension selection question will be generated asking the user to pick one of the dimensions D3 or D1 to navigate on.

A composite question is generated if a rank of the cube-category is similar to the rank of one or more dimensions having highest rank in the list of dimensions. The composite question is a combination of the category selection question and one of dimension selection question and a dimension navigation question. For example, if the rank of the root category "Books" with choices "Science" and "Fiction" is equal to the rank of the dimension "Price" which has a rank higher than the remaining dimension "Year of publishing" by the threshold value, then a composite question combining the category selection question for the category "Books" and a dimension navigation question for the dimension "Price" will be generated.

Figure 6A:
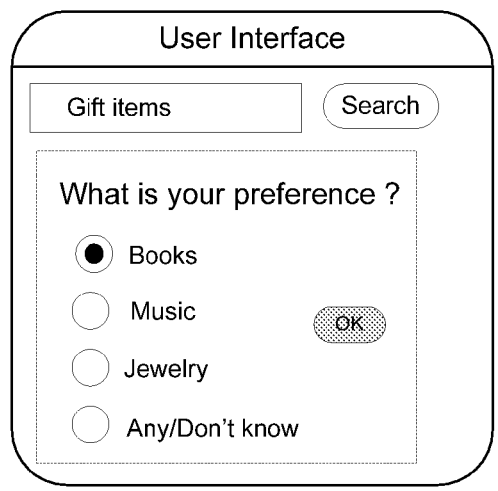
FIG. 6 shows a schematic representation of working scenarios, in accordance with an exemplary embodiment of the present invention.

FIGS. 6a, 6b, 6c and 6d depict a schematic representation of working scenarios, in accordance with an exemplary embodiment of the present invention. FIG. 6a illustrates a scenario in which a user selects cube-category, which has been already explained in conjunction with steps 416 and 418 in FIG. 4a. The user initially types a search query "Gift items" in a search box and presses a "Search button". Consider for example that the number of content-entities pertaining to the search query "Gift items" is more than a predefined number. The predefined number depends on the device characteristics of information device 102 or a predefined duration for which information can be rendered on voice based information device 102 so as to be comfortably heard by the user. In this example, the size of the display screen is small and the number of content-entities is too large to be displayed in the display screen. Therefore, a question "What is your preference?" with a number of choices "Books", "Music", "Jewelry" and "Any/don't know" is generated and rendered to the user to narrow down the content-entities. The choices here refer to the various cube-categories pertaining to the search query. It can be noted that as represented by FIG. 6a, the user selects the cube-category "Books". Thereafter, the content-entity set will have only the content-entities corresponding to the cube-category "Books". The fourth choice represented as "Any/don't know" is a default response. The user can select this choice when not being sure about the selection of a particular choice among the other three choices or if he/she does not care about the question. In this case, the system will generate another question.

Figure 6B:
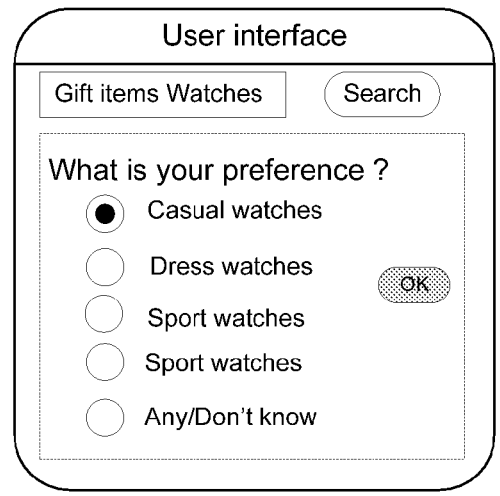

FIG. 6b illustrates a scenario in which a user initially types a search query and then refines the search query, which has been explained already in conjunction with steps 412 and 414 of FIG. 4a. Consider that the user types a search query "Gift items". If the user is not interested in the displayed choices, the user may refine the search query "Gift items" by adding an additional search term "Watches" in the search box. Now the content-entity set will have terms related to "gift items watches". Subsequently, a question "What is your preference?" with choices like "Casual watches", "Dress watches", "Sport watches", "Dive watches" and "Any/don't know" is displayed to narrow down the content-entity set further.

Figure 6C:
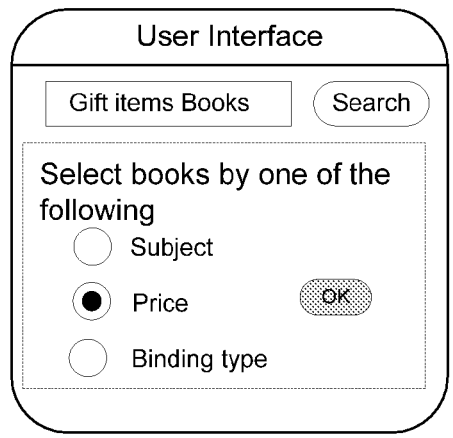

FIG. 6c illustrates an example in which a user selects a dimension in a cube-category, which has been explained in conjunction with steps 420 and 422 of FIG. 4b. In this example, the question "Select books by one of the following:" and choices "Subject", "Price", and "Binding type" are displayed. The choices here refer to different dimensions of the cube-category "Books". Consequently, the user selects the "Price" dimension in the example illustrated in FIG. 6c.

Figure 6D:
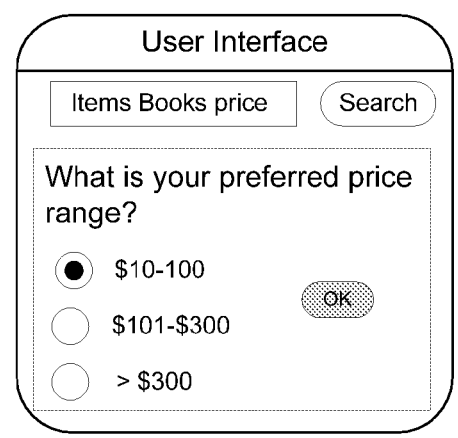

FIG. 6d illustrates a scenario in which a user selects a dimension value from a list of dimension values within a dimension, which has been explained in conjunction with steps 424-436 in FIG. 4b. In this example, the user navigates the dimension "Price". The question "What is your preferred price range?" with choices "$10-100", "$101-300", ">$300" and "Any/don't know" is displayed to the user to allow for further navigation in the selected dimension.

Figure 7:
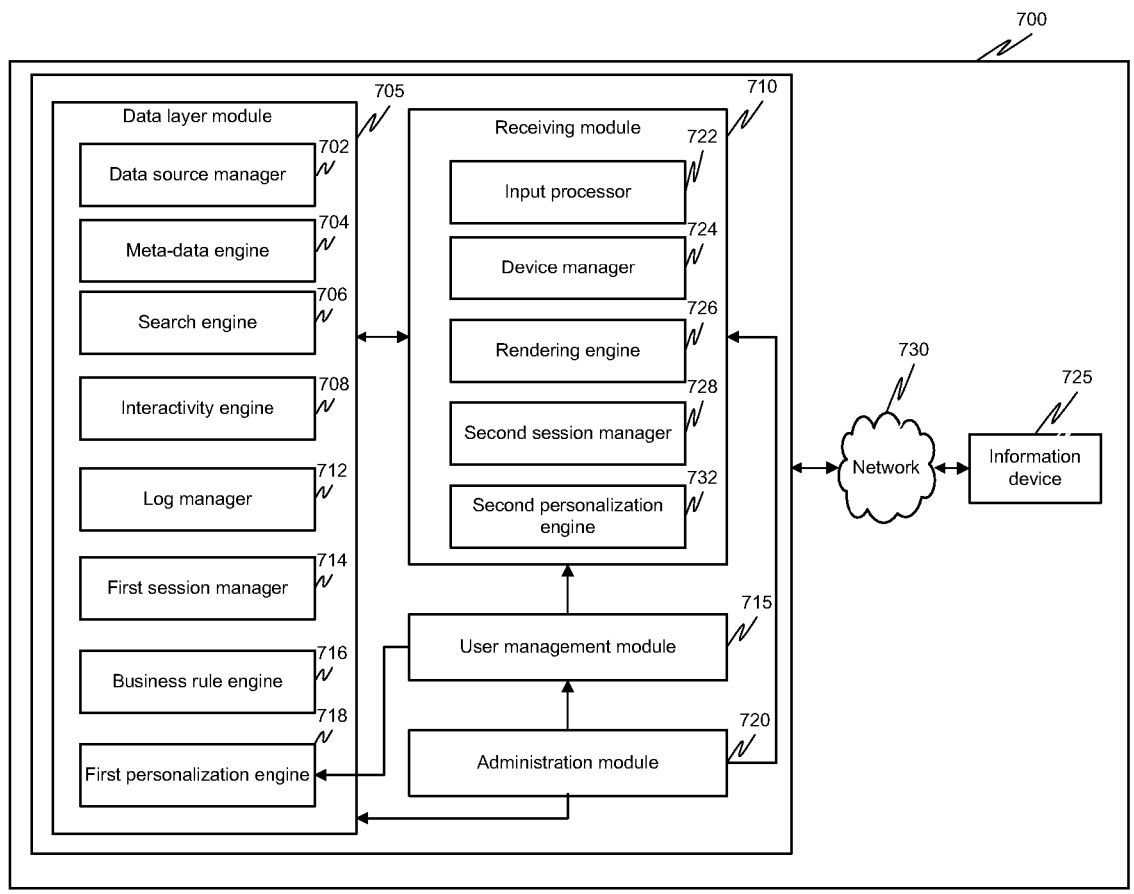
FIG. 7 illustrates a block diagram showing a system for searching information stored on a content corpus, in accordance with an embodiment of the present invention.

FIG. 7 is a block diagram for a system 700 for searching information stored on a content corpus server accordance with an embodiment of the present invention. System 700 comprises a data layer module 705, a receiving module 710, a user management module 715 and an administration module 720. In an embodiment of the present invention, administration module 720 manages data layer module 705 and receiving module 710. Receiving module 710 is connected to an information device 725 through a network 730 e.g. Internet. In an embodiment of the present invention, data layer module 705 comprises a data source manager 702, a meta-data engine 704, a search engine 706, an interactivity engine 708, a log manager 712, a first session manager 714, a business rule engine 716, and a first personalization engine 718.

Data layer module 705 generates one or more questions corresponding to a search query input by a user through information device 725. The questions are generated based on a predetermined ordering criterion when a predefined condition is true. The predefined condition is true only if the number of content-entities pertaining to the search query is more than a predefined number. The predefined number depends on the device characteristics of information device 725 or a predefined duration for which information can be rendered on voice based information device 725 so as to be comfortably heard by the user. Data source manager 702 collects content-entities from several content providers. Meta-data engine 704 acquires meta-data corresponding to the content-entities. Search engine 706 is provided in data layer module 705 for textual search and data retrieval operations. Search engine 706 accesses the content-entities gathered by data source manager 702 and the meta-data provided by meta-data engine 704 for indexing. Interactivity engine 708 processes search query and responses received from a user and facilitates data layer module 705 for generating one or more questions.

In an embodiment of the present invention, receiving module 710 comprises an input processor 722, a device manager 724, a rendering engine 726, a second session manager 728 and a second personalization engine 732. First session manager 714 transmits the generated question to second session manager 728 in receiving module 710. Second session manager 728 in turn passes the question to rendering engine 726. Device manager 724 maintains characteristics of all possible information devices 725 and style sheets that can be used for information devices 725. The style sheet specifies a format for rendering the generated question and information on information device 725. Second personalization engine 732 is provided in receiving module 710 for providing user interface level personalization rules to rendering engine 726. Rendering engine 726 converts the question and information so that it can be rendered in a suitable form on information device 725. In one embodiment of the present invention, rendering engine 726 outputs the question from interactivity engine 708 to information device 725 in accordance with the characteristics of information device 725. In another embodiment of the present invention, rendering engine 726 outputs the question to information device 725 based on the user interface level personalization rules provided by second personalization engine 732.

As mentioned earlier, interactivity engine 708 processes the meta-data provided by meta-data engine 704 for generating questions based on the predetermined ordering criterion when the predefined condition is true. The predetermined ordering criterion corresponds to one or more of selectivity function, information retrieval (IR) rank, personalization rules and business rules. Interactivity engine 708 computes selectivity and information retrieval ranks by using the meta-data information provided by meta-data engine 704. Ranking of the meta-data can be performed based on the relevance of the meta-data to the search query input by the user. The selectivity ranks are based on the expected number of user inputs or clicks that are required to render the information requested by the user. IR ranking is performed based on the ranks of the meta-data.

The business rule comprises business metrics, which can comprise assigning priority to advertisements. For instance, a cube-category corresponding to an advertisement can be assigned with more priority than other cube-categories. The business metrics can also include ranking of auctioned keywords, and classification of keywords into revenue generating and revenue-not-generating choices. In an embodiment of the present invention, business rule engine 716 provided in data layer module 705 provides business rule ranks to interactivity engine 708. The business rule ranks are applied to the meta-data for generating appropriate questions.

In another embodiment of the present invention, user management module 715 captures and stores a profile of the user. The profile of the user comprises access rights, requirements, characteristics, settings and preferences of the user. First session manager 714 in data layer module 705 maintains user session. The details of the user session include context information of the user such as questions provided to a user, responses received from the user, other actions performed by the user. Log manager 712 receives these details from first session manager 714 and maintains a user-log. First personalization engine 718 receives the profile of the user from user management module 715 and maintains a personalization rules. The personalization rule can be determined based on the profile of the user, profiles of a plurality of users having similar profile as that of the user, and user-log. The personalization rules comprise rule based ranking rules, content based ranking rules and collaborative ranking rules. The rule based ranking rules are applied if the user satisfies a predefined set of conditions. The content based ranking rules are implemented for ranking content-entities based on a choice or a response given by the user.

First personalization engine 718 provides personalization rule ranks to interactivity engine 708. To put differently, ranks are applied to the meta-data based on the personalization rules for generating questions to the user. The personalization rules are used to apply rank to the meta-data in order to ask appropriate and minimum number of questions from the user. By asking appropriate questions, information desired by user can be recognized easily and quickly.

Receiving module 710 receives a response to the question from the user through network 730. The response is provided by the user using information device 725. Input processor 722 provided in receiving module 710 processes the user response from information device 725 and converts it to a suitable format. Second session manager 728 transfers the user responses from input processor 722 to first session manager 714.

First session manager 714 passes the response to log manager 712 and interactivity engine 708. Interactivity engine 708 processes the response and determines the need for generating subsequent questions to the user. Interactivity engine 708 checks if the predefined condition is true based on the response. When the predefined condition is not true, a user interface in information device 725 renders the information. If the predefined condition is true, data layer module 705 generates subsequent questions to the user to narrow the content-entity set. The questions are iteratively generated until the predefined condition is not true so that information can be rendered in information device 725. In one embodiment of the present invention, user responses are input through the user interface.

The various embodiments of the present invention provide a method and a system for searching information using information device. The method described in the present invention enables a user of an information device like mobile telephone to search information over a large content corpus easily and quickly. Appropriate questions are asked to the user based on the search query and subsequent responses input by the user in order to identify the content desired by the user. As the searching method involves interactive question and answer session, desired content can be provided quickly to the user without requiring much effort from the user. The content corpus server stores heterogeneous content-entities in semi-structured and multidimensional form. Further, a meta-data for the content-entities is processed and stored in the content corpus server. Hence, data retrieval efficiency is improved remarkably.

Ranks can be provided to the meta-data on the basis of business rules so that questions and information are selectively provided to the user. This actually helps in improving the monetization rate of the content and raising the profits of the content portals. Similarly, ranks can be provided to the meta-data on the basis of personalization rules to provide more suitable questions and information to the user. This contributes to increasing customer satisfaction and building customer relationship. Moreover, it also helps in providing a user friendly search environment. The present invention provides a semi-structured data model which does not require rigid schema. It permits the content providers to describe the content and meta-data in a flexible way so as to suit their business requirements. The method and system of the present invention facilitates searching over large information corpus by portable hand-held devices like PDA and pocket PC, and other devices like IVR phones, ASR phone, interactive TV, game console and telematics device. The present invention is capable of handling huge corpus of content-entities, deep categories, and large number of dimensions. It allows existence of disparate content-entities in the same corpus and accessing of all these content-entities through the same interface.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. In a computing system having a content corpus server storing data corresponding to content-entities, the content corpus server being adaptively coupled to an information device, a method for searching information associated with the content-entities stored on the content corpus server using the information device, the method comprising:
    a. generating at least one question corresponding to a search query for searching the information on the information device, wherein the at least one question is generated based on a predetermined ordering criterion when a predefined condition is true and on the data corresponding to the content-entities relating to the search query, the at least one question selected to reduce the number of content-entities that have information relevant to the search query, wherein the predefined condition is defined by the output interface characteristics of the information device and wherein the predetermined ordering criterion is utilized to minimize an expected number of user inputs that will lead the predefined condition to not be true;
    b. receiving at least one response to the at least one question; and
    c. rendering the information on the information device, wherein the information is rendered based on the at least one of the search query and a response, wherein the content corpus server organizes the content-entities into a plurality of cubes, each cube comprises entities having a similar set of dimensions, a dimension of a content-entity corresponds to at least one feature of the entity, dimensions corresponding to the content-entities differentiate the content-entities in the corpus content server.

2. The method of claim 1 wherein the predefined condition is true if a number of content-entities pertaining to the search query is more than a predefined number, the predefined number depends on at least one of device characteristics of the information device and a predefined duration for which the information can be rendered on the information device, wherein the device characteristics comprise at least one of a size of a display screen of the information device, resolution of the display screen and input unit of the information device.

3. The method of claim 1 further comprising:
    a. evaluating if the predefined condition is true based on the search query and a response received corresponding to a question; and
    b. generating at least one succeeding question based on the predetermined ordering criterion, the search query and the response received corresponding to the question, if the predefined condition is true.

4. The method of claim 3, wherein the question is selected from a first plurality of questions based on the predetermined ordering criterion, the first plurality of questions are generated based on the content-entities stored in the content corpus server corresponding to the search query.

5. The method of claim 3, wherein the at least one succeeding question is selected from a second plurality of questions based on the predetermined ordering criterion, the second plurality of questions is generated based on the search query and the response to the question.

6. The method of claim 1, wherein the content corpus server stores data corresponding to content-entities as metadata.

7. The method of claim 1, wherein a number of choices generated along with the question are ranked based on the predetermined ordering criterion.

8. The method of claim 1, wherein the predetermined ordering criterion corresponds to one or more of:
    a. selectivity function;
    b. information retrieval rank;
    c. personalization rules; and
    d. business rules.

9. The method of claim 8, wherein the selectivity function is a measure of expected number of user inputs to retrieve corresponding information requested by the user.

10. The method of claim 8, wherein the information retrieval rank is based on ranks of the meta-data, the ranks of the meta-data are determined based on relevance of the meta-data to the search query.

11. The method of claim 8, wherein the personalization rules are determined based on one or more of:
    a. a profile of the user;
    b. profiles of a plurality of users that are similar to the profile of the user; and
    c. a user-log comprising log of sessions, wherein the user-log is stored on the content corpus server.

12. The method of claim 8, wherein the personalization rules comprise:
    a. rule based ranking rules, wherein the rule based ranking rule are applied if the user satisfies a predefined set of conditions;
    b. content based ranking rules, wherein a content based ranking rule uses choice of the user to rank an entity; and
    c. collaborative ranking rules, wherein a collaborative ranking rule uses choices of a plurality of users having profiles similar to profile of the user.

13. The method of claim 8, wherein the business rules comprise business metrics, wherein business metrics comprise one or more of:
    a. assigning priority for advertisements;
    b. ranking auctioned keywords; and
    c. classifying keywords into revenue generating and non-revenue generating choices.

14. The method of claim 1, wherein the plurality of cubes are categorized into a plurality of cube-categories, the cube-categories are arranged in a hierarchy, wherein each of the cube-categories comprises a conformance list, the conformance list comprises a set of dimensions common across the corresponding cubes of the cube-category.

15. The method of claim 14, wherein the content corpus server derives a content-entity set based on at least one of the search query and the response to the question, wherein the content-entity set comprises:
    a. content-entities matching at least one of the search query and the response to the question;
    b. at least one cube-category, wherein a cube-category of the at least one cube-category is assigned as a root cube-category; and c. a list of dimensions corresponding to the at least one cube-category.

16. The method of at claim 15, wherein the at least one response from the user comprises:
   a. refining the search query;
   b. selecting a cube-category;
   c. selecting a dimension in a cube-category;
   d. selecting a dimension value for the dimension in the cube-category; and
   e. selecting a predetermined default response.

17. The method of claim 16, wherein the content-entity set is narrowed based on a refined search query, wherein the refined search query is formed by adding a search string to the search query.

18. The method of claim 16, wherein the content-entity set is narrowed based on the cube-category selection, if the user selects the cube-category, wherein the narrowed content-entity set comprises content-entities belonging to the cube-category only.

19. The method of claim 16, wherein a current level of a dimension being navigated by the user is increased, if the current level of the dimension has been traversed by the user by selecting a dimension value.

20. The method of claim 19, wherein the dimension is removed from the content-entity set, if the current level of the dimension is a leaf level.

21. The method of claim 19, wherein the dimension is removed from the content-entity set, if each of the current level of the dimension and each sub level of the current level has at most one child.

22. The method of claim 15, wherein a rank of each dimension in the list of dimensions and a rank of the root cube-category are computed.

23. The method of claim 22, wherein a category selection question is generated if the rank of the root cube-category is greater than the rank of each dimension in the list of dimensions.

24. The method of claim 23, wherein a composite question is generated, if the rank of the cube-category is similar to rank of at least one dimension having highest rank in the list of dimensions, wherein the composite question is a combination of the category selection question and one of a dimension selection question and dimension navigation question.

25. The method of claim 22, wherein one of a dimension selection question and a dimension navigation question is generated if the rank of the root cube-category is less than the rank of at least one dimension in the list of dimensions.

26. The method of claim 25, wherein a dimension navigation question is generated for the dimension having a rank which is higher than ranks of other dimensions in the list of dimensions by at least a threshold value.

27. The method of claim 25, wherein a dimension selection question is generated for a first set of dimensions in the list of dimensions, wherein the rank of each dimension in the first set of dimensions is similar, the rank of each dimension in the first set of dimensions is higher than rank of each dimension in a second set of dimensions in the list of dimensions by at least the threshold value.

28. A hardware implemented system for searching information stored on a content corpus server using an information device, the content corpus server storing data corresponding to content-entities, the content corpus server being adaptively coupled to the information device, the system comprising:
   a. a data layer module, wherein the data layer module generates at least one question corresponding to a search query, the at least one question is generated based on a predetermined ordering criterion when a predefined condition is true and on the data corresponding to the content-entities relating to the search query, the at least one question selected to reduce the number of content-entities that have information relevant to the search query, wherein the predefined condition is defined by the output interface characteristics of the information device and wherein the predetermined ordering criterion is utilized to minimize an expected number of user inputs that will lead the predefined condition to not be true;
   b. a receiving module, wherein the receiving module receives at least one response to the at least one question from a user; and
   c. a user interface, wherein the user interface renders the question and information based on the at least one response and the search query, wherein at least one of the data layer module, the receiving module, or the user interface are implemented using hardware.

29. The system of claim 28, wherein the data layer module comprises:
   a. a data source manager, the data source manager collects content-entities from a plurality of content providers;
   b. a meta-data engine, the meta-data engine extracts meta-data corresponding to the content-entities;
   c. a search engine, the search engine performs textual search operation; and
   d. an interactivity engine, wherein the interactivity engine processes the search query.

30. The system of claim 29, wherein the receiving module comprises:
   a. an input processor, the input processor processes the at least one response from the user;
   b. a device manager, the device manager maintains characteristics of the information device and corresponding style sheet, wherein the style sheet specifies a format for rendering the at least one question and the information; and
   c. a rendering engine, the rendering engine interacts with the interactivity engine to output the at least one question.

31. The system of claim 29 further comprising:
   a. a log manager, wherein the log manager maintains a user-log, the user-log comprises log of sessions;
   b. a first session manager, wherein the session manager manages a user session, the user session comprises context information about the user;
   c. a business rule engine, wherein the business rule engine manages business rules, the business rule comprises business metrics; and
   d. a first personalization engine, wherein the first personalization engine maintains personalization rules.

32. The system of claim 31 further comprising:
   a. a second session manager, wherein the second session manager manages the user session at user interface level; and
   b. a second personalization engine, wherein the second personalization engine maintains personalization rules at user interface level.

33. The system of claim 31, wherein the business rule engine provides business rule ranks to the interactivity engine.

34. The system of claim 31, wherein the first personalization engine receives a user profile from a user management module, the user management module storing the user profile.

35. The system of claim 31, wherein the first personalization engine provides personalization rule ranks to the interactivity engine.

36. The system of claim 28 further comprising:
a. a user management module, wherein the user management module stores a profile of the user; and
b. an administration module, wherein the administration module manages the data layer module and the receiving module.

* * * * *